US008180987B2

(12) United States Patent  
Hellman et al.

(10) Patent No.: US 8,180,987 B2
(45) Date of Patent: May 15, 2012

(54) ENCRYPT-ONLY DATA STORAGE CARTRIDGE

(75) Inventors: Diana Joyce Hellman, Tucson, AZ (US); Glen Alan Jaquette, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 12/371,868

(22) Filed: Feb. 16, 2009

(65) Prior Publication Data

US 2010/0208380 A1 Aug. 19, 2010

(51) Int. Cl.
G06F 12/14 (2006.01)

(52) U.S. Cl. ........ 711/163; 711/164; 713/189; 713/190; 713/193; 380/239; 360/60; 360/131

(58) Field of Classification Search .......... 711/163–164; 713/189–190, 193; 380/239; 360/60, 131
See application file for complete search history.

(56) References Cited

U.S. PATENT DOCUMENTS

| 2005/0213466 | A1 | 9/2005 | Hommeau et al. | |
| 2007/0043958 | A1 | 2/2007 | Sasaki | |
| 2007/0113104 | A1 | 5/2007 | Witt et al. | 713/193 |
| 2007/0180272 | A1 | 8/2007 | Trezise et al. | 713/193 |
| 2008/0063209 | A1 | 3/2008 | Jaquette et al. | 380/284 |
| 2008/0065882 | A1* | 3/2008 | Goodman et al. | 713/165 |
| 2008/0065903 | A1 | 3/2008 | Goodman et al. | 713/193 |
| 2008/0065906 | A1 | 3/2008 | Itagaki et al. | |
| 2008/0165973 | A1 | 7/2008 | Gavillan et al. | 380/278 |
| 2008/0273696 | A1 | 11/2008 | Greco | |

FOREIGN PATENT DOCUMENTS

| GB | 2431249 | 4/2007 |
| GB | 2431252 | 4/2007 |
| GB | 2434896 | 8/2007 |
| JP | 2004/088453 | 3/2004 |

* cited by examiner

*Primary Examiner* — Jasmine Song
(74) *Attorney, Agent, or Firm* — John H. Holcombe

(57) ABSTRACT

Control of the encryption of data for storage with respect to removable data storage cartridges having a recording media and having cartridge memory with at least a portion lockable to read-only, employs the steps of inspecting the read-only portion of the cartridge memory of the removable data storage cartridge for an "Encrypt-Only" flag. If the "Encrypt-Only" flag is present, writes to the recording media of the removable data storage cartridge are limited to data in an encrypted format, if any; and, else, writes to the recording media of the removable data storage cartridge are allowed for data in any of encrypted and unencrypted formats.

25 Claims, 8 Drawing Sheets

ENCRYPT-ONLY DATA STORAGE CARTRIDGE

DOCUMENTS INCORPORATED BY REFERENCE

Commonly assigned U.S. Pat. No. 7,386,667 is incorporated for its showing of an automated data storage library; commonly assigned U.S. patent application Ser. No. 11/530,022 (U.S. Patent Application Publication No. 2008/0065882) is incorporated for its showing of configuring a data storage drive to communicate with encryption and key managers; and commonly assigned U.S. patent application Ser. No. 11/530,008 (U.S. Patent Application Publication No. 2008/0066192) is incorporated for its showing of keyless copying of encrypted data.

FIELD OF THE INVENTION

This invention relates to the handling of removable data storage cartridges having recording media, and, more particularly, to the encryption of data with respect to the recording media.

BACKGROUND OF THE INVENTION

In many situations in the field of data storage employing removable data storage cartridges, protecting and securing data is one concern that must be addressed. For example, one security concern is that someone will steal a removable data storage cartridge and then attempt to access the data. However, it may not be necessary to secure all data. Allowing some data to be unsecured may enhance the performance of the data storage and retrieval process.

A means of securing data is data encryption. For example, data to be encrypted is written to the removable data storage cartridge in an encrypted format, and data that is unsecured is written to the removable data storage cartridge in an unencrypted format. Encrypted format data must be read and decrypted to be usable, whereas unencrypted format data need not. Various encrypted formats and various unencrypted formats are known in the art.

Data storage cartridges are often employed in an automation situation such as an automated data storage library. The encryption may be managed by the library, the system in which the library is a component, or by an application, and may be tailored to specific needs. The encryption may be transparent to the user, that is, done as needed automatically in accordance with established policy.

SUMMARY OF THE INVENTION

Methods, control systems, cartridge handling systems and automated data storage libraries control the encryption of data for storage with respect to removable data storage cartridges having a recording media and having cartridge memory with at least a portion lockable to read-only.

The present invention may allow the enabling of transparent encryption of a data storage drive that is not in automation, and a "fail safe" for an automation environment.

In one embodiment, the method comprises the steps of inspecting the read-only portion of the cartridge memory of the removable data storage cartridge for an "Encrypt-Only" flag. If the "Encrypt-Only" flag is present, writes to the recording media of the removable data storage cartridge are limited to data in an encrypted format, if any; and, else, writes to the recording media of the removable data storage cartridge are allowed for data in any of encrypted and unencrypted formats.

In a further embodiment, the method is conducted by a control of a data storage drive currently housing the removable data storage cartridge.

In another embodiment, the encrypted format data comprises at least one of data encrypted during the write, and copied, previously encrypted data.

In a further embodiment, the previously encrypted data comprises data copied in encrypted form, without decrypting, from another removable data storage cartridge.

In another embodiment, the step of limiting writes comprises preventing writes to the recording media of data in unencrypted formats, and allowing encrypted data format information to be written in unencrypted form.

In still another embodiment, an initial step comprises determining whether the removable data storage cartridge comprises a cartridge memory with a capability of having an "Encrypt-Only" flag in a read-only portion of the cartridge memory, and, if so, conducting the inspecting step.

In another embodiment, a method for initializing a removable data storage cartridge having a recording media and having a cartridge memory comprises the steps of determining whether the removable data storage cartridge is to be an encrypt-only cartridge; if so, writing an "Encrypt-Only" flag to the cartridge memory at a predetermined portion of the cartridge memory; and locking at least the predetermined portion of the cartridge memory to read-only.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
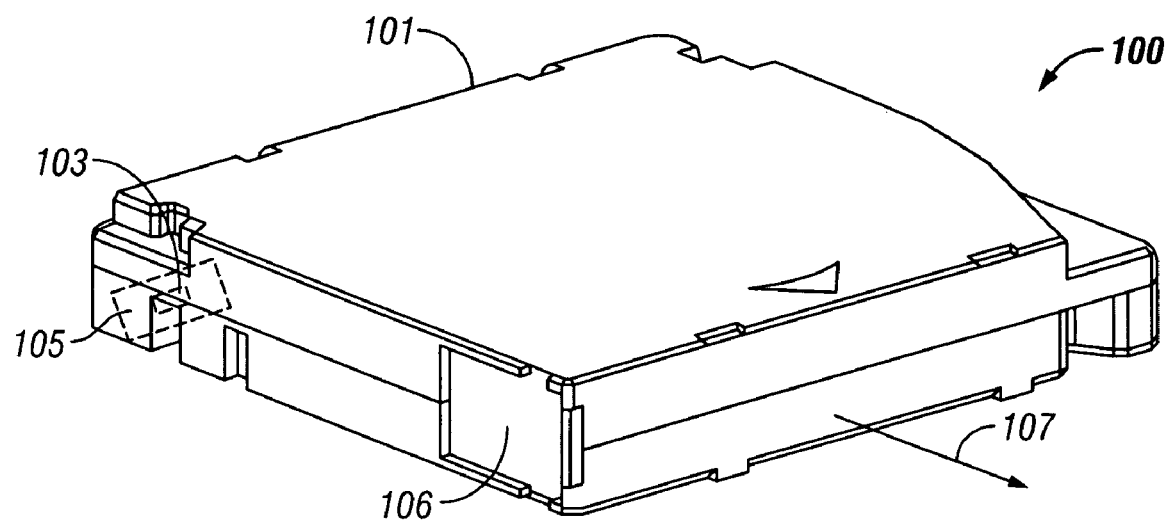
FIG. 1 is a view of a removable data storage cartridge with a cartridge memory which implements the present invention.
Figure 2:
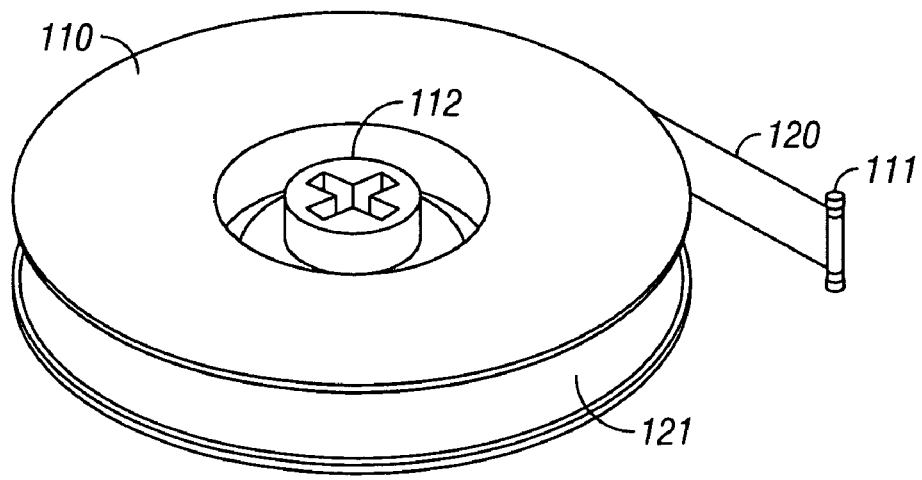
FIG. 2 is an isometric view of a reel of magnetic tape of the removable data storage cartridge of FIG. 1.

Referring to FIGS. 1 and 2, an example of a removable data storage cartridge 100 comprises a magnetic tape cartridge having a cartridge body 101, cartridge door 106 and a cartridge memory 103 on circuit board 105.

A recording media, such as rewritable magnetic tape 121 is wound on a reel 110, and a leader pin 111 is used to thread the magnetic tape 121 through the tape path of a magnetic tape drive. As is understood by those of skill in the art, a magnetic tape data storage cartridge comprises a length of magnetic tape wound on one or two reels, an example of which is those adhering to the Linear Tape Open (LTO) format. The illustrated magnetic tape cartridge 100 is a single reel cartridge. Magnetic tape cartridges may also comprise dual reel cartridges in which the tape is fed between reels of the cartridge.

In the tape cartridge 100, a brake button 112 is used to hold the tape reel 110 in place and to prevent it from rotating when tape cartridge 100 is not loaded in a tape drive. An optional tape leader 120 may be interposed between the leader pin 111 and the magnetic tape 121.

Other examples of removable data storage cartridges may comprise optical tape, or optical or magnetic disk, or rewritable memory such as solid state disk.

The cartridge memory 103, for example, comprises a transponder having a contactless interface, which is retained in the cartridge 100, for example, by being encapsulated by the cartridge when it is assembled, as is understood by those of skill in the art. The cartridge memory is at an angle so that the cartridge memory can be accessed wirelessly by the robot accessor of an automated data storage library or by a magnetic tape drive.

The cartridge memory 103 typically stores information in protected pages and in unprotected pages that can be easily updated.

Figure 3:
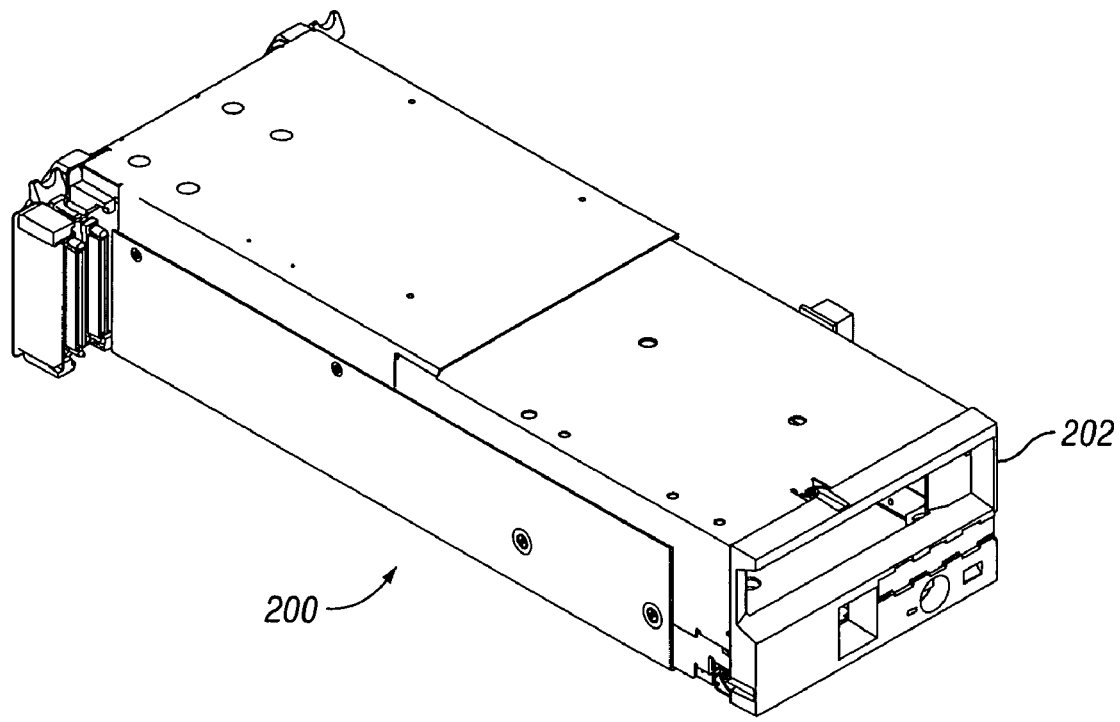
FIG. 3 is a view of a data storage drive which implements the present invention.
Figure 4:
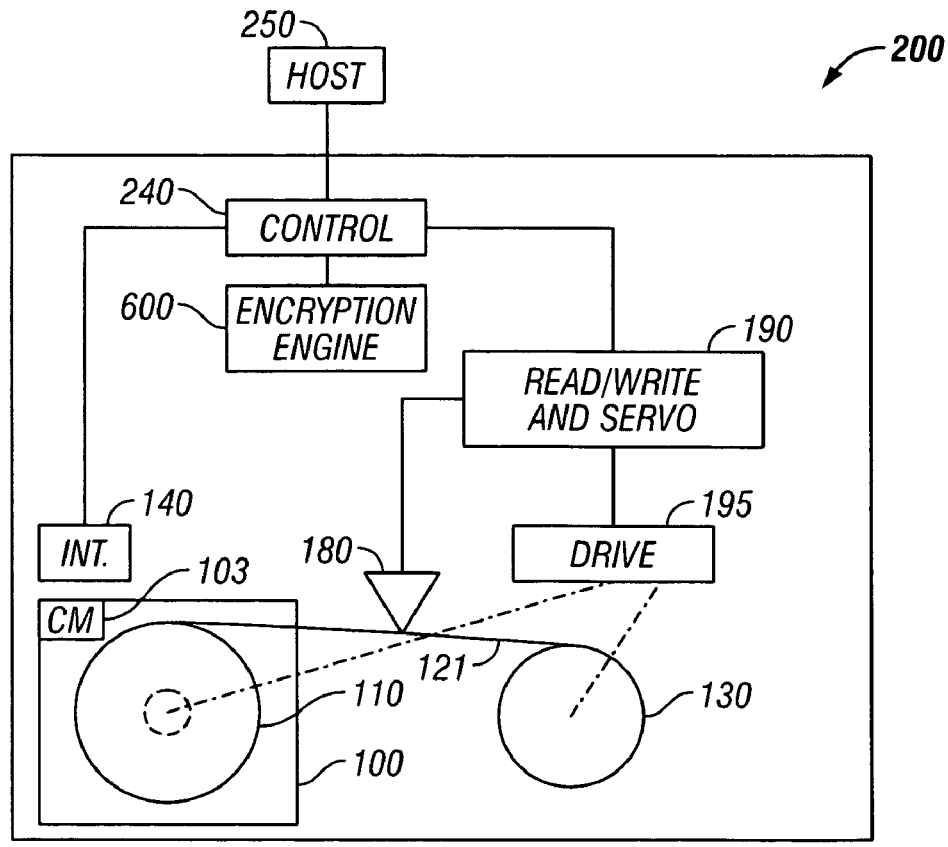
FIG. 4 is a diagrammatic illustration of the data storage drive of FIG. 3.

Referring to FIGS. 3 and 4, a data storage drive 200 is illustrated. One example of a data storage drive, such as a magnetic tape drive, in which the present invention may be employed is the IBM® 3580 Ultrium magnetic tape drive based on LTO technology, with microcode, etc., to perform desired operations with respect to the data storage cartridge 100.

A further example of a single reel magnetic tape data storage drive and associated cartridge is the IBM® 3592 TotalStorage Enterprise magnetic tape drive and associated magnetic tape cartridge. An example of a dual reel cartridge is the IBM® 3570 magnetic tape cartridge and associated drive.

Referring to FIGS. 1-4, in the instant example, the data storage magnetic tape cartridge 100 is inserted into opening 202 of the magnetic tape drive 200 along direction 107, and loaded in the magnetic tape drive 200.

The recording media, such as magnetic tape, is threaded and fed between the cartridge reel 110 and a take up reel 130 in the magnetic tape drive. Alternatively, both reels of a dual reel cartridge are driven to feed the magnetic tape between the reels.

The magnetic tape drive comprises a memory interface 140 for reading information from, and writing information to, the cartridge memory 103 of the magnetic tape cartridge 100, for example, in a contactless manner. A read/write system is provided for reading and writing information to the magnetic tape, and, for example, may comprise a read/write and servo head system 180 with a servo system for moving the head laterally of the magnetic tape 121, a read/write servo control 190, and a drive motor system 195 which moves the magnetic tape 121 between the cartridge reel 110 and the take up reel 130 and across the read/write and servo head system 180. The read/write and servo control 190 controls the operation of the drive motor system 195 to move the magnetic tape 121 across the read/write and servo head system 180 at a desired velocity, and, in one example, determines the lateral location of the read/write and servo head system with respect to the magnetic tape 121. In one example, the read/write and servo head system 180 and read/write and servo control 190 employ servo signals on the magnetic tape 121 to determine the longitudinal location of the read/write and servo head system, and in another example, the read/write and servo control 190 employs at least one of the reels, such as by means of a tachometer, to determine the longitudinal location of the read/write and servo head system with respect to the magnetic tape 121. The read/write and servo head system 180 and read/write and servo control 190 may comprise hardware elements and may comprise any suitable form of logic, including a processor operated by software, or microcode, or firmware, or may comprise hardware logic, or a combination. The drive system 195 may also be operated to fast forward the magnetic tape and to rapid rewind the magnetic tape at high speed without reading or writing data.

A control system 240 communicates with the memory interface 140, and communicates with the read/write system, e.g., at read/write and servo control 190. The control system 240 may comprise any suitable form of logic apparatus, including a processor operated by software, or microcode, or firmware, or may comprise hardware logic, or a combination.

The illustrated and alternative embodiments of data storage drives are known to those of skill in the art, including magnetic tape drives which employ dual reel cartridges, optical tape drives, optical or magnetic disk drives or receivers, and solid state memory receivers.

The control system 240 typically communicates with one or more host systems 250, and operates the magnetic tape drive 200 in accordance with commands originating at a host. Alternatively, the magnetic tape drive 200 may form part of a subsystem, such as an automated data storage library, and may also receive and respond to commands from the subsystem.

As illustrated, the data storage drive 200 provides information to, and reads information from, the cartridge memory 103 of the removable data storage cartridge 100, and provides information to, and reads information from, the magnetic tape 121 of the removable data storage cartridge 100.

Figure 5:
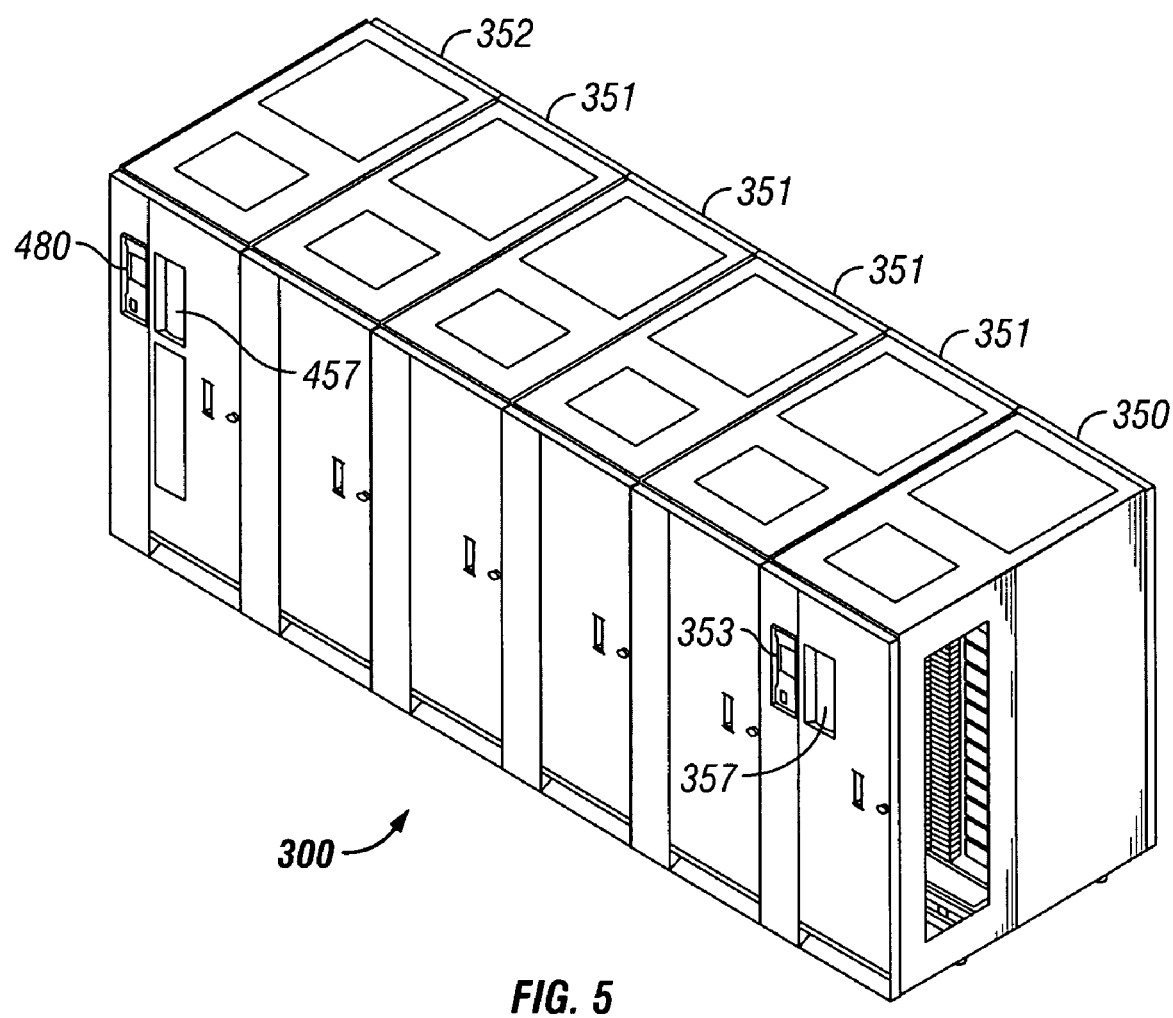
FIG. 5 is a view of an automated data storage library which implements the present invention in the automation environment.
Figure 6:
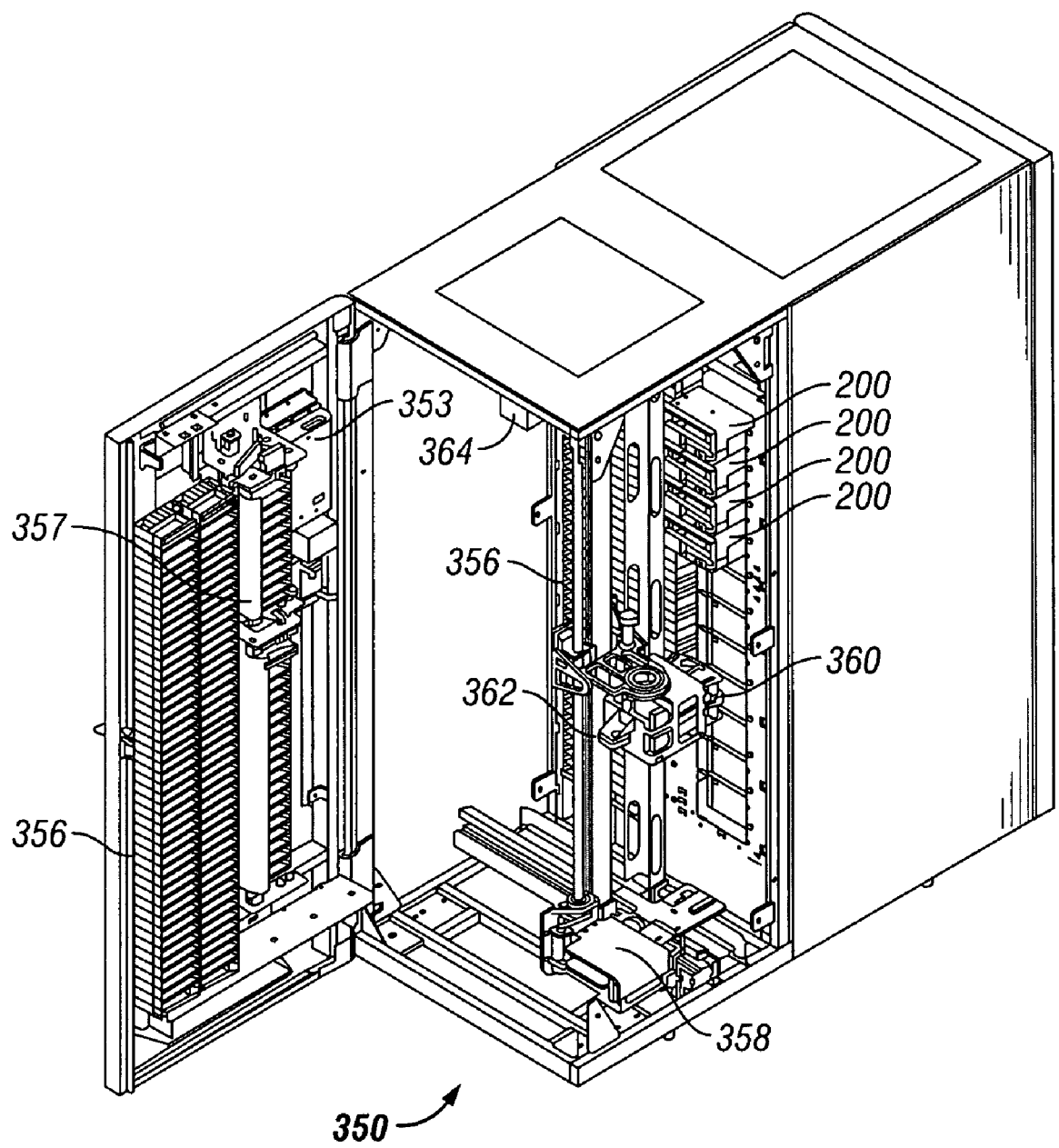
FIG. 6 is view of an open frame of the automated data storage library of FIG. 5.
Figure 7:
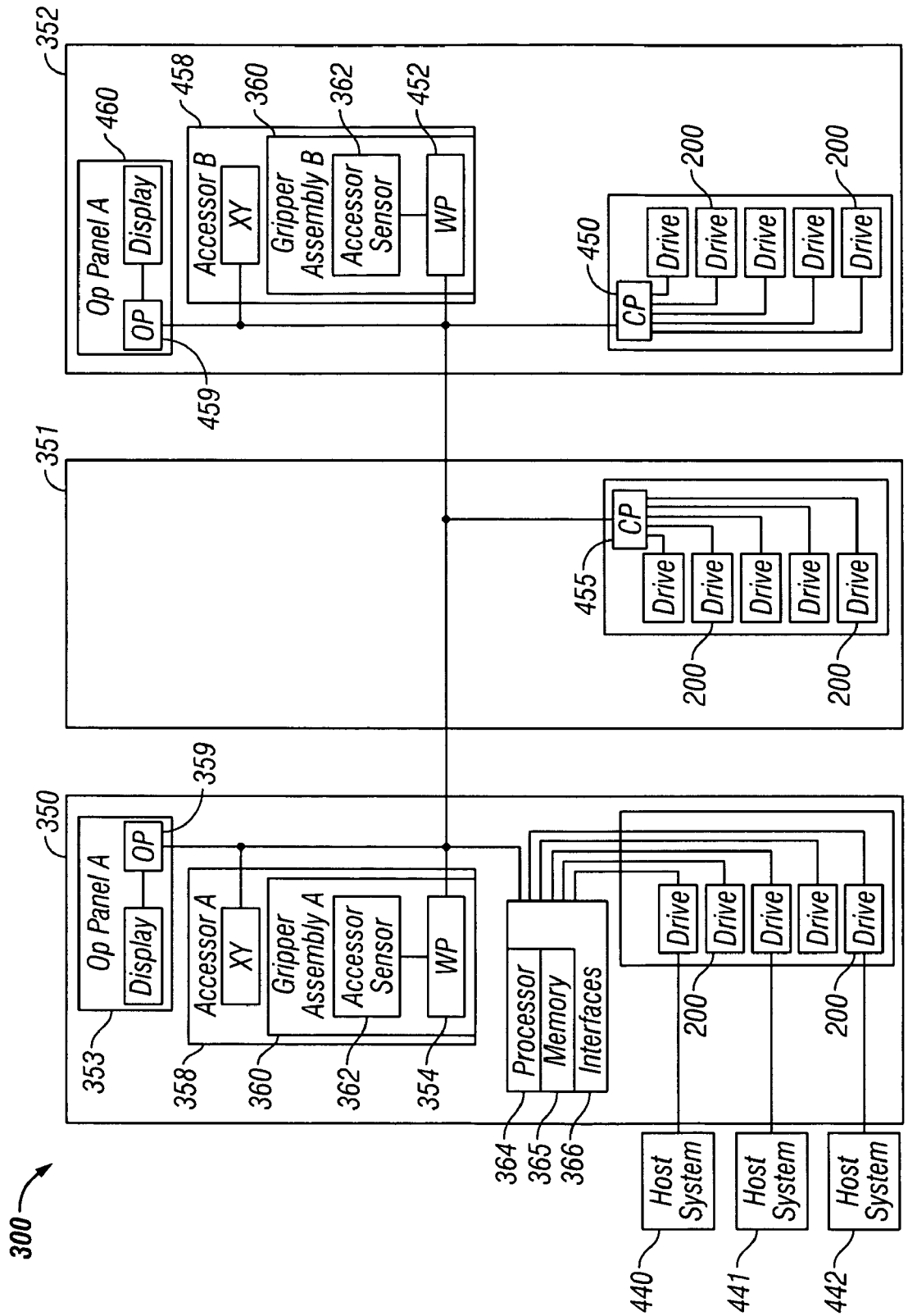
FIG. 7 is a diagrammatic illustration of the automated data storage library of FIG. 5.

FIGS. 5, 6 and 7 illustrate an embodiment of an automated data storage library 300, configured in accordance with the present invention, which is arranged to access data storage media, such as magnetic tape cartridges, typically in response to commands from at least one external host system, and comprises one or more frames 350, 351, 352, each of which may have a plurality of storage shelves 356 for storing the cartridges, and may have a plurality of magnetic tape data storage drives 200 for reading and/or writing data with respect to the magnetic tape cartridges. The library 300 further comprises at least one robot accessor 358, 458 for transporting the cartridges between the storage shelves 356 and the data storage drives 200. The robot accessor 358, 458 comprises a gripper assembly 360 for gripping one or more cartridges, and comprises an accessor sensor 362 comprising an interface to read information from, and writing information to, the cartridge memory 103 of the removable data storage cartridge 100 of FIG. 1, for example, in a contactless manner. The accessor sensor may also comprise a reading system, such as an LED (Light Emitting Diode) emitter/detector, a bar code scanner, RFID reader, or other reading system to read the labels of the cartridges or about the library.

The library 300 also comprises one or more library controllers 364 to operate the library, communicate with a host system 440 or host systems, communicate with the data storage drives 200, and may communicate with other processors of the library (if present). Alternatively, the data storage drives 200 may communicate with a host system or systems 441, 442, directly, and the library to host system or systems communication may be through the tape drive communication. Further, the library may provide one or more operator panels 353, 460, 480 for communicating with the library controller. The library controller may be set up as a centralized control system, or as a distributed control system. In the example of a distributed control system, additional processors 354, 359, 455, 450, 452, 459 may together with processor 364 comprise the library controller, and operate specific functions of the library. For example, processors 354 and 452, called "WP", may operate the robot accessors 358, 458 to transport the data storage cartridges, processors 359, 459, called "OP", may control the operator panels 353, 460, 480, and processors 364, 455, and 450, called "CP", may provide communications to data storage drives, host computers, remote computers, etc. Examples of an automated data storage library comprise the IBM® TS3500 tape library and the library discussed in the coassigned '667 patent.

The library controller(s), herein, also called "control system" typically comprises one or more processors with memory, such as memory 365 illustrated as provided for processor 364, for storing information and program information for operating the processor(s). Herein "processor" may comprise any suitable logic apparatus, microprocessor, computer processor and associated memory for responding to program instructions, and the associated memory may comprise fixed or rewritable memory or data storage devices. The program information may be supplied to the library controller or memory from a host 440, 441, 442, or via a data storage drive 200, or by an input from a floppy or optical disk, or by being read from a cartridge, or by a web user interface or other network connection, or by any other suitable means. Processors 354, 359, 455, 450, 452, 459, may also be provided with memory of a lesser or greater capacity, and the memory may also be a non-volatile memory, a volatile memory, or may comprise both.

Data storage cartridges may be added to or removed from the library, for example, at input/output stations 357, 457. Typically, cartridges that have been unused for some period of time are removed from the library and may be archived. New, uninitialized cartridges are added to the library to store new data. The input/output stations 357, 457 typically provide a signal to identify that a cartridge or cartridges are input into the library, or that an input/output station door has been opened and/or closed.

An inventory is typically maintained by either the library, e.g. at one or more of the processors, or for the library by a host. Herein, the processor(s) of the library or of the host that maintains the inventory is called a "library controller", such as library controller 364. The inventory is of data storage cartridges, identifying active cartridges and a scratch pool, and their current location within the library, for example, the storage shelf storing the cartridge, or, if the cartridge is in a drive, identifying that drive.

The library controller 364 (and other processors) are provided with interfaces 366 configured to communicate with the host system 440, 441, 442, or host systems, communicate with the data storage drives 200, and communicate with other processors of the library. The interfaces 366 may comprise serial interfaces such as RS-232 (Recommended Standard), USB (Universal Serial Bus), SAS (Serial Attached SCSI), IEEE 1394 (Institute of Electrical and Electronics Engineers), Fibre Channel, or any other serial interface as is known to those of skill in the art. Alternatively, interfaces 366 may comprise optical interfaces such as Fibre Channel, ESCON (Enterprise Systems CONnection), or any other optical interface as is known to those of skill in the art. In addition, interfaces 366 may comprise wireless interfaces such as IEEE 802.11, or any other wireless interface as is known to those of skill in the art. Still further, interfaces 366 may comprise parallel interfaces such as SCSI (Small Computer Systems Interface), or any other parallel interface as is known to those of skill in the art.

Figure 8:
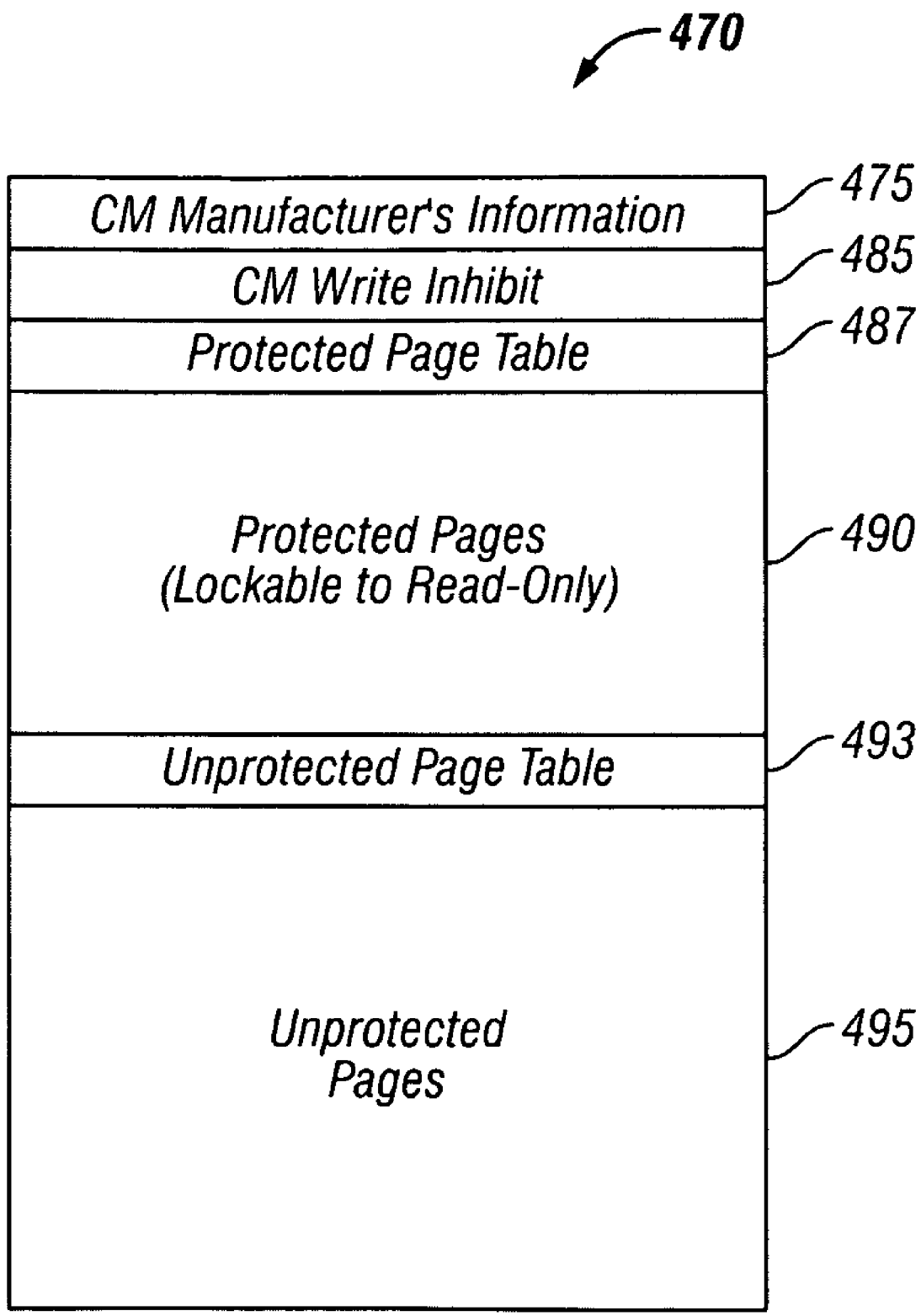
FIG. 8 is a diagrammatic illustration of the contents of a cartridge memory of FIG. 1, including contents in accordance with the present invention.

Referring to FIG. 8, an example of the content 470 of a cartridge memory, such as cartridge memory 103 of FIG. 1, is illustrated. One example of a cartridge memory and its content is described in Standard ECMA-319, June 2001, "Data Interchange on 12, 7 mm 384-Track Magnetic Tape Cartridges—Ultrium-1 Format", Annex D—LTO Cartridge Memory, pp. 95-115. The cartridge memory 103 of FIG. 2 may be similar to the memory and transponder used in "smart cards" as are known to those of skill in the art.

In the embodiment of FIG. 8, the content 470 of the cartridge memory is arranged in areas of various sizes with information organized into "sections". The specific layout of the content and the terminology used may be altered as is known to those of skill in the art. Herein, the sections may be divided into subsections or "pages".

Certain pages of the cartridge memory, such as contained in section 490, are originally writable and may be read, but are lockable to read-only to become protected pages.

Section 475 comprises information provided for or by the manufacturer of the cartridge memory.

Section 495 comprises pages that are unprotected and may be writable at any time.

Section 485 is the location for a write inhibit code, which, when implemented, locks the lockable section of the cartridge memory and converts the "lockable to read only" sections to read-only, for example, including itself. As one example, a write inhibit code may comprise a set of characters, or, as another example, a write inhibit code may comprise a single bit in a given location. Since the write inhibit code is locked and cannot be written over, the write inhibit code may not be retracted, and once a cartridge memory is initialized and locked, it cannot be reinitialized.

The write inhibit section 485 also defines the bounds of the locked sections, in one example by specifying an address range or address ranges in which nothing else may be updated. Alternatively, a pointer may provide a single address such that the portion of the memory from the beginning to the pointer address is protected when a write inhibit flag is set. If the pointer is within the protected portion of the memory, the pointer itself is locked and cannot be changed.

Section 487 comprises a table describing the content of section 490, and is also protectable. Section 493 comprises a table describing the content of section 495, and may be constantly updated to track updates to the unprotected pages of section 495.

The manufacturer's information of section 475 includes a cartridge memory serial number which identifies the specific cartridge memory, and is written in a lockable section of the cartridge memory by the manufacturer of the cartridge memory that may be locked at the same time or separately from the implementation of write inhibit of section 485. An identification of the cartridge memory may also be provided in the recording media of the removable data storage cartridge to insure that a cartridge memory has not been removed and replaced.

Figure 9:
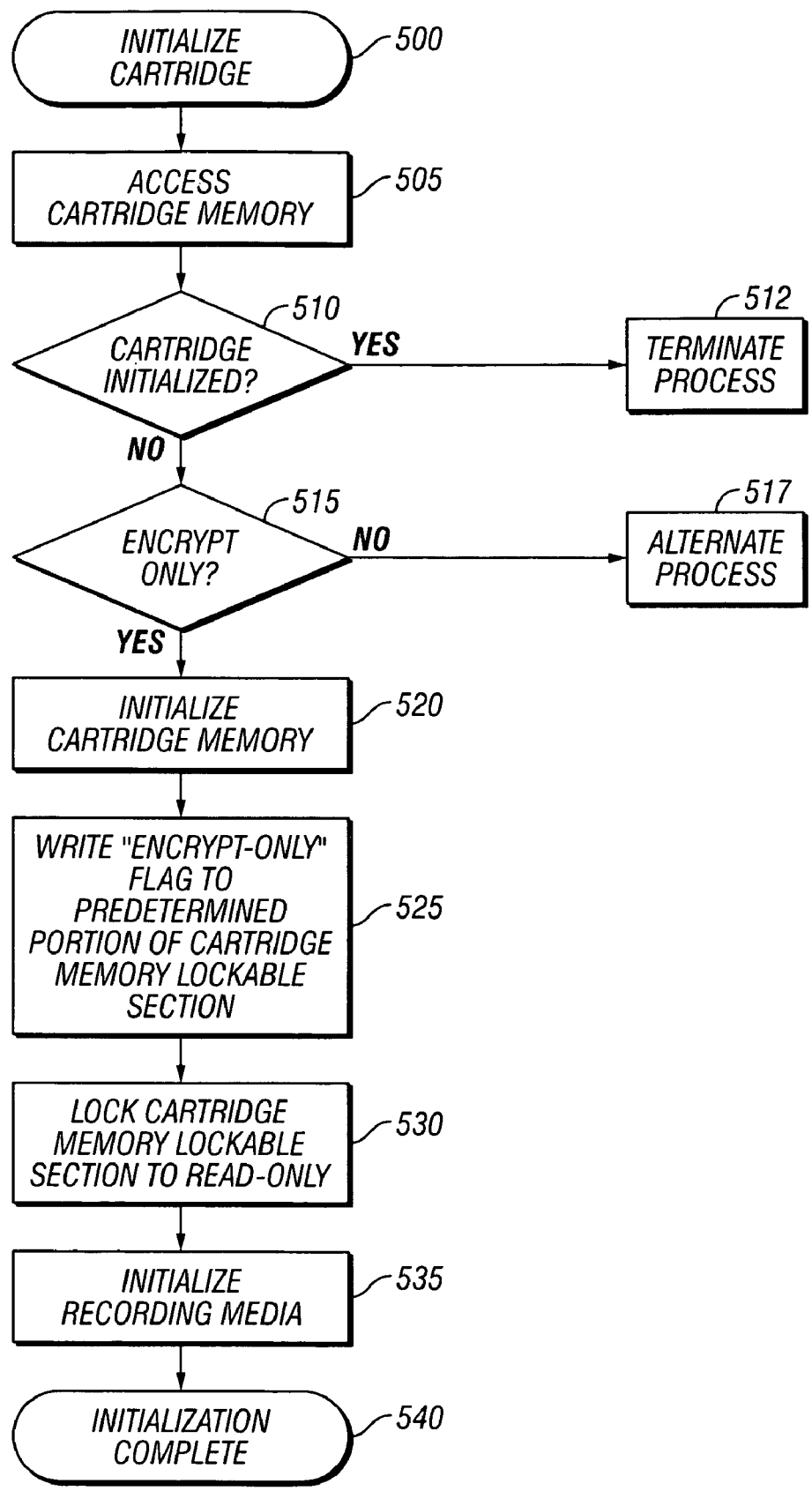
FIG. 9 is a flow chart depicting embodiments of the methods of the present invention for initializing a removable data storage cartridge.

Referring to FIG. 9, and also to FIGS. 1, 4, 6, 7 and 8, a removable data storage cartridge 100 is initialized beginning at step 500 where it is accessed, for example, from a storage shelf 356 of an automated data storage library 300 by a robot accessor 358, 458. Alternatively, the removable data storage cartridge is accessed from an input/output station 357, 457. Still alternatively, especially in the absence of an automated data storage library, the removable data storage cartridge is accessed manually, or is accessed from a cartridge loader, or is accessed manually in an automated data storage library without using the accessor.

The cartridge memory 103, in one embodiment, is accessed and read in step 505 by the accessor 358, 458, at sensor 362, and the cartridge 100 may then be mounted in a data storage drive 200, such as a magnetic tape drive.

Alternatively, the cartridge 100 is mounted in a data storage drive 200, and the cartridge memory 103 is read in step 505 by the data storage drive.

In step 505, the information read from the cartridge memory 103 includes information whether the cartridge has been initialized. If, in step 510, the cartridge has been initialized, the process is terminated in step 512. If the cartridge is uninitialized, "NO" in step 510, it will be initialized, including step 515 which determines whether the particular cartridge is to be initialized as an "Encrypt-Only" cartridge.

The initialization may be conducted by a data storage drive 200, for example, employing control 240, or by a specialized initialization device. In step 515, an initialization control determines whether the particular cartridge is to be an "Encrypt-Only" cartridge, for example, in accordance with an instruction provided to the initialization control. If not, "NO" in step 515, an alternate initialization process is conducted in step 517.

If the removable data storage cartridge 100 is selected to be an "Encrypt-Only" cartridge and identified as such in step 515, in one embodiment, a normal initialization process is conducted in step 520, with the exception that the lockable sections of the cartridge memory 103 are not locked to read-only.

Once the normal initialization process is completed, the control writes an "Encrypt-Only" flag to the predetermined portion of the lockable section of the cartridge memory in step 525. In one example, the "Encrypt-Only" flag is written as a character or bit within a protected page of the cartridge memory.

After the complete initialization of the cartridge memory, the lockable sections of the cartridge memory are locked to read-only in step 530.

Thus, an uninitialized removable data storage cartridge is initialized in such a way that an associated data storage drive is explicitly instructed that all data written must be encrypted, independent of any other mechanism.

In an optional step 535, the recording media of the removable data storage cartridge is also initialized, for example, identifying the serial number of the cartridge memory and thereby providing an indication whether the cartridge memory has been replaced.

Step 540 indicates that the initialization of the removable data storage cartridge is complete.

Figure 10:
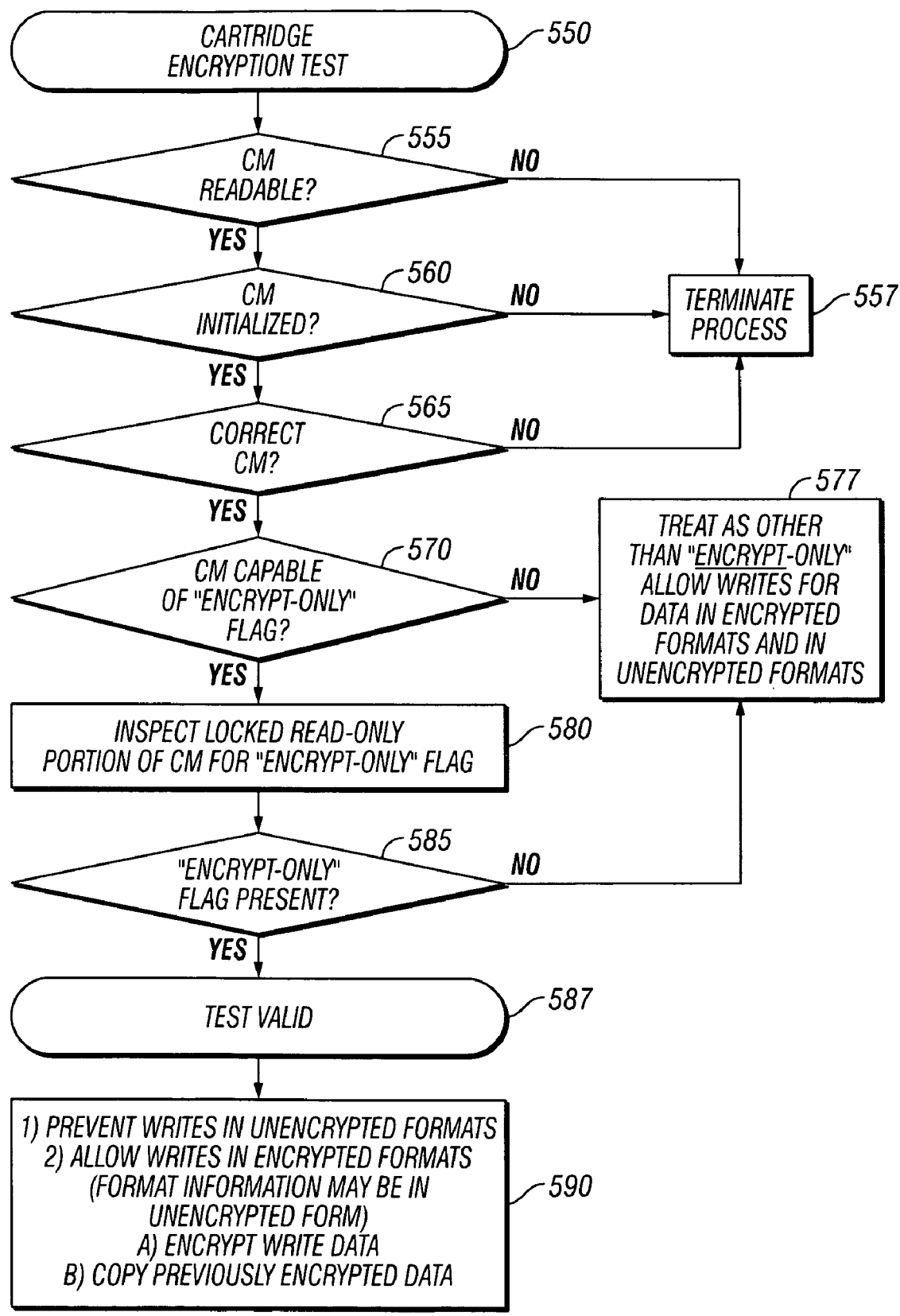
FIG. 10 is a flow chart depicting embodiments of the methods of the present invention for handling an initialized removable data storage cartridge in accordance with the present invention.

Referring to FIG. 10, and also to FIGS. 1, 4, 6, 7 and 8, a removable data storage cartridge 100 is accessed and a cartridge encryption status test conducted beginning at step 550 where it is accessed, for example, from a storage shelf 356 of an automated data storage library 300 by a robot accessor 358, 458. Alternatively, the removable data storage cartridge is accessed from an input/output station 357, 457. Still alternatively, especially in the absence of an automated data storage library, the removable data storage cartridge is accessed manually, or is accessed from a cartridge loader, or is accessed manually in an automated data storage library without using the accessor.

The cartridge memory 103, in one embodiment, is accessed and read in step 555 by the accessor 358, 458, at sensor 362, and the cartridge 100 may then be mounted in a data storage drive 200, such as a magnetic tape drive.

Alternatively, the cartridge 100 is mounted in a data storage drive 200, and the cartridge memory 103 is read in step 555 by the data storage drive.

If the attempt at reading the cartridge memory in step 555 is unsuccessful, the process is terminated in step 557. If the cartridge memory 103 can be read as indicated in step 555, the information read from the cartridge memory 103 includes information whether the cartridge has been initialized. If the control determines in step 560 that the cartridge memory indicates that the cartridge is not initialized, the process is also terminated in step 557. Alternatively, the termination in step 557 leads to the initialization process of FIG. 9.

At some point, for example in step 565, the control may determine whether the removable data storage cartridge has the correct cartridge memory, for example, by comparing the serial number of the cartridge memory from a locked read-only section of the cartridge memory to the cartridge memory serial number recorded on the recording media 121. If the serial numbers do not match, the process is terminated in step 557.

Still referring to FIG. 10, and also to FIGS. 1, 4, 6, 7 and 8, in step 570, the control determines whether the cartridge memory 103 is of the type that is capable of having an "Encrypt-Only" flag. For example, the removable data storage cartridge may be from an earlier era, and be of a type that is not capable of having an "Encrypt-Only" flag. If step 570 indicates that the removable data storage cartridge is not capable of having an "Encrypt-Only" flag, in step 577, the cartridge is treated as a normal cartridge, or as other than an "Encrypt-Only" cartridge, allowing writes to the recording media 121 of the removable data storage cartridge of data in any of encrypted and unencrypted formats.

If the cartridge is of the type that can have an "Encrypt-Only" flag, then in step 580, the control operates the interface, such as interface 140 of the data storage drive, to inspect the read-only portion of the cartridge memory at which an "Encrypt-Only" flag would be located for the "Encrypt-Only" flag.

The control then determines whether the "Encrypt-Only" flag is present at the inspected portion of the read-only section of the cartridge memory. If the flag is not present, the process goes to step 577, where the cartridge is treated as a normal cartridge, or as other than an "Encrypt-Only" cartridge, allowing writes to the recording media 121 of the removable data storage cartridge of data in any of encrypted and unencrypted formats, as discussed above.

If the determination is made in step 585 that the "Encrypt-Only" flag is present, the test is considered valid in step 587, leading to step 590.

If the "Encrypt-Only" flag is present, in step 590 writes to the recording media of the removable data storage cartridge are limited to data in an encrypted format, if any; and, else, writes to the recording media of the removable data storage cartridge are allowed for data in any of encrypted and unencrypted formats. In one embodiment, the control of the write encryption is conducted by the control 240 of the data storage drive 200 currently housing the removable data storage cartridge 100 of FIG. 4. As one example, the data storage drive may not be located in a library or other automation environment. The encryption, however, may be transparent to the user because the presence of an "Encrypt-Only" cartridge or cartridges causes the drive to only write encrypted data without action by the user, making the encryption transparent to the user.

If, instead, the data storage drive is in an automated system, such as a library, the encryption may be controlled by the application, the system, or the library, such as discussed by the commonly assigned '022 application. In that case, the control may comprise a control of the library, or may comprise a control of the data storage drive. The normal operation of the control will be to accomplish the encryption of data, for example, transparently to the user. However, the presence of an "Encrypt-Only" cartridge or cartridges serves as a fail-safe, requiring encryption, even should an erroneous, an accidental, or intentional deactivation of the normal encryption process occur.

In one embodiment, the encrypted format data is encrypted during the write by, for example, encryption engine 600. Any suitable encryption engine or encryption application may be employed without departing from the present invention.

In another embodiment, the encrypted format data comprises data that was previously encrypted and is copied to the removable data storage cartridge. The copied previously encrypted data comprises data copied in encrypted form, without decrypting, from another removable data storage cartridge, either at another data storage drive, or at the same drive and temporarily stored, for example, by control 240, or host system 250 of FIG. 4, or by host system 440, 441, 442, or processor 364 and memory 365 of FIG. 7. The copying of data in encrypted form may include, for example, copying accompanying metadata to the data storage media or to the cartridge memory. An example, called "keyless copying", is discussed in the coassigned '008 application.

In another embodiment, the step 590 of FIG. 10 of limiting writes comprises preventing writes to the recording media of data in unencrypted formats. However, metadata for the encrypted format data is allowed to be written in unencrypted form.

The method of the invention can take the form of an entirely hardware embodiment, or an embodiment stored by and configured to cause a processor to operate associated hardware.

Furthermore, the invention can take the form of a computer program product comprising a computer readable storage medium providing program code for use by or in connection with a processor comprising a computer or any instruction execution system.

The medium can be an electronic, magnetic, optical, electromagnetic, infrared, or semiconductor system (or apparatus or device). Examples of a computer readable storage medium include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk-read/write (CD-R/W), DVD, and Blu-Ray™.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Connections, for example from host system 250 to the control 240 may encompass connection links including intervening private or public networks. The communication links may comprise serial interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for writing data to a removable data storage cartridge having a recording media and having cartridge memory with at least a portion lockable to read-only, comprising:
    inspecting said lockable read-only portion of said cartridge memory of said removable data storage cartridge for an "Encrypt-Only" flag;
    if said "Encrypt-Only" flag is present, limiting writes to said recording media of said removable data storage cartridge to data in an encrypted format, if any; and
    else, allowing writes to said recording media of said removable data storage cartridge of data in any of encrypted and unencrypted formats.

2. The method of claim 1, conducted by a control of a data storage drive currently housing said removable data storage cartridge.

3. The method of claim 1, wherein said encrypted format data comprises at least one of data encrypted during said write, and copied, previously encrypted data.

4. The method of claim 3, wherein said previously encrypted data comprises data copied in encrypted form, without decrypting, from another removable data storage cartridge.

5. The method of claim 1, wherein said step of limiting writes comprises preventing writes to said recording media of data in unencrypted formats, and allowing encrypted data format information to be written in unencrypted form.

6. The method of claim 1, comprising the initial step of determining whether said removable data storage cartridge comprises a cartridge memory with a capability of having an "Encrypt-Only" flag in a lockable read-only portion of said cartridge memory, and, if so, conducting said inspecting step.

7. A method for initializing a removable data storage cartridge having a recording media and having a cartridge memory, comprising the steps of:
    determining whether said removable data storage cartridge is to be an encrypt-only cartridge;

if so, writing an "Encrypt-Only" flag to said cartridge memory at a predetermined portion of said cartridge memory; and locking at least said predetermined portion of said cartridge memory to read-only.

8. A control system associated with a data storage drive, said data storage drive configured to handle a removable data storage cartridge, and to read and write data with respect to a recording media of said removable data storage cartridge; said at least one control additionally associated with an interface configured to at least read a cartridge memory of said removable data storage cartridge, said control system configured to:

operate said interface to read information from a portion of said cartridge memory of said removable data storage cartridge that is lockable to read only;

to inspect said information read from said read-only portion of said cartridge memory for an "Encrypt-Only" flag;

if said "Encrypt-Only" flag is present, to limit writes by said data storage drive to said recording media of said removable data storage cartridge to data in an encrypted format, if any; and else, to allow said data storage drive to write to said recording media of said removable data storage cartridge, data in any of encrypted and unencrypted formats.

9. The control system of claim 8, wherein said data storage drive comprises said interface, and wherein said control system is configured to operate said data storage drive to handle a removable data storage cartridge, and to read and write data with respect to a recording media of said removable data storage cartridge.

10. The control system of claim 8, wherein at least one control of said control system comprises an element of an automated data storage library, said automated data storage library additionally comprising storage shelves configured to store removable data storage cartridges, at least one input station configured to receive removable data storage cartridges, at least one said data storage drive, and at least one robot accessor configured to transport at least one removable data storage cartridge between said storage shelves, said at least one input station and said at least one data storage drive, and said robot accessor additionally comprising said interface.

11. The control system of claim 8, wherein at least one control of said control system is located remotely from said data storage drive.

12. The control system of claim 8, wherein said encrypted format data comprises at least one of data encrypted during said write, and copied, previously encrypted data.

13. The control system of claim 12, wherein said previously encrypted data comprises data copied in encrypted form, without decrypting, from another removable data storage cartridge.

14. The control system of claim 8, wherein said control system is configured to limit said writes by preventing writes to said recording media of data in unencrypted formats, and allowing encrypted data format information to be written in unencrypted form.

15. The control system of claim 8, wherein said control system is configured to initially determine from said interface whether said removable data storage cartridge comprises a cartridge memory with a capability of having an "Encrypt-Only" flag in a read-only portion of said cartridge memory, and, if so, to conduct said inspecting step.

16. A cartridge handling system configured to initialize a removable data storage cartridge having a recording media and having a cartridge memory, comprising:

an interface configured to write information to and read information from said cartridge memory of said removable data storage cartridge; and a control system configured to:

determine whether said removable data storage cartridge is to be an encrypt-only cartridge;

if so, cause said interface to write an "Encrypt-Only" flag to said cartridge memory at a predetermined portion of said cartridge memory; and cause said interface to lock at least said predetermined portion of said cartridge memory to read-only.

17. A cartridge handling system configured to read data from and write data to a removable data storage cartridge, said removable data storage cartridge having a recording media and having cartridge memory with at least a portion lockable to read-only, comprising:

an interface configured to write information to and read information from said cartridge memory of said removable data storage cartridge;

a read/write system configured to read and write data with respect to said recording media of said removable data storage cartridge loaded at said cartridge handling system; and a control system configured to:

operate said interface to read information from said lockable read-only portion of said cartridge memory of said removable data storage cartridge;

to inspect said information read from said read-only portion of said cartridge memory for an "Encrypt-Only" flag;

if said "Encrypt-Only" flag is present, to limit writes by said read/write system to said recording media of said removable data storage cartridge to data in an encrypted format, if any; and else, to allow said read/write system to write to said recording media of said removable data storage cartridge, data in any of encrypted and unencrypted formats.

18. The cartridge handling system of claim 17, wherein said encrypted format data comprises at least one of data encrypted during said write, and copied, previously encrypted data.

19. The cartridge handling system of claim 18, wherein said previously encrypted data comprises data copied in encrypted form, without decrypting, from another removable data storage cartridge.

20. The cartridge handling system of claim 17, wherein said control system is configured to limit said writes by preventing writes to said recording media of data in unencrypted formats, and allowing encrypted data format information to be written in unencrypted form.

21. The cartridge handling system of claim 17, wherein said control system is configured to initially determine from said interface whether said removable data storage cartridge comprises a cartridge memory with a capability of having an "Encrypt-Only" flag in a read-only portion of said cartridge memory, and, if so, to conduct said inspecting step.

22. An automated data storage library, comprising:

storage shelves configured to store removable data storage cartridges, at least one said removable data storage cartridge having a recording media and having cartridge memory with at least a portion lockable to read-only;

at least one input station configured to receive removable data storage cartridges;

at least one data storage drive, said data storage drive configured to handle said removable data storage cartridge, and to read and write data with respect to said recording media of said removable data storage cartridge;

at least one robot accessor configured to transport at least one removable data storage cartridge between said storage shelves, said at least one input station and said at least one data storage drive;

an interface configured to write information to and read information from said cartridge memory of said removable data storage cartridge; and a control system configured to:

operate said interface to read information from said read-only portion of said cartridge memory of said removable data storage cartridge;

to inspect said information read from said read-only portion of said cartridge memory for an "Encrypt-Only" flag;

if said "Encrypt-Only" flag is present, to limit writes by said read/write system to said recording media of said removable data storage cartridge to data in an encrypted format, if any; and else, to allow said read/write system to write to said recording media of said removable data storage cartridge, data in any of encrypted and unencrypted formats.

23. The automated data storage library of claim 22, wherein said encrypted format data comprises at least one of data encrypted during said write, and copied, previously encrypted data.

24. The automated data storage library of claim 22, wherein said previously encrypted data comprises data copied in encrypted form, without decrypting, from another removable data storage cartridge.

25. The automated data storage library of claim 22, wherein said control system is configured to initially determine from said interface whether said removable data storage cartridge comprises a cartridge memory with a capability of having an "Encrypt-Only" flag in a read-only portion of said cartridge memory, and, if so, to conduct said inspecting step.

* * * * *